No. 771,844. PATENTED OCT. 11, 1904.
A. D. TAIT.
WHIFFLETREE HOOK.
APPLICATION FILED MAR. 21, 1904.
NO MODEL.
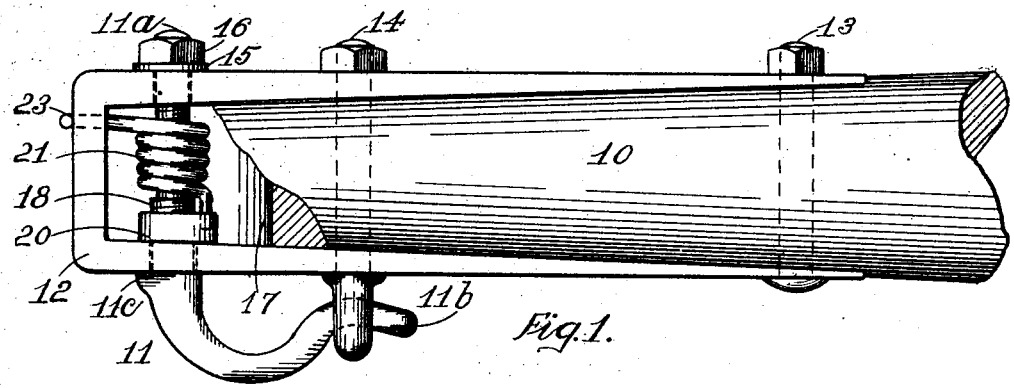
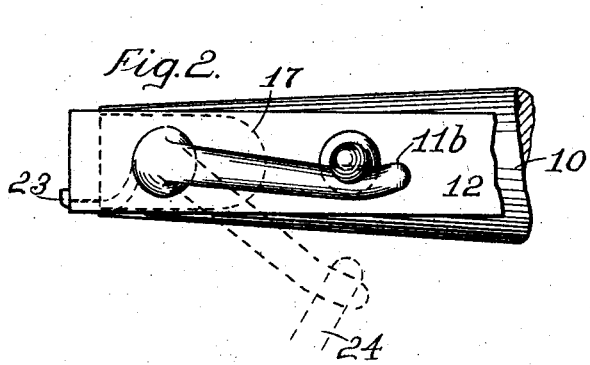
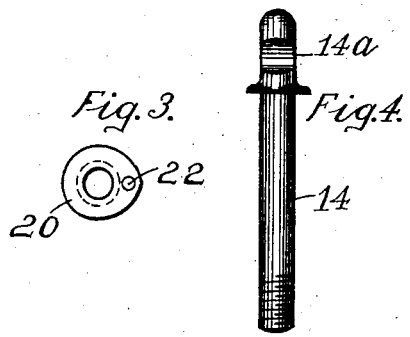
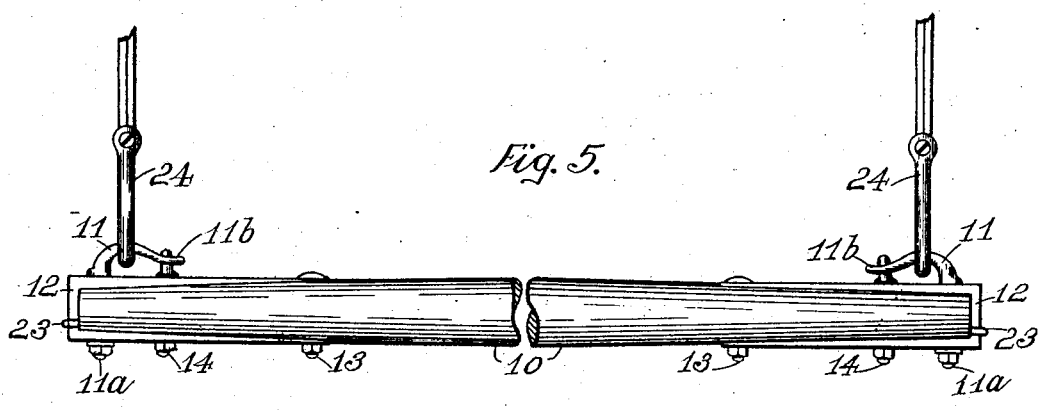
Witnesses:
Chas. B. Gillon
E. M. Klatcher
Inventor:
Alfred D. Tait.
By Louis K. Gieson
Atty.

No. 771,844.

Patented October 11, 1904.

UNITED STATES PATENT OFFICE.

ALFRED D. TAIT, OF EVANSTON, ILLINOIS.

WHIFFLETREE-HOOK.

SPECIFICATION forming part of Letters Patent No. 771,844, dated October 11, 1904.

Application filed March 21, 1904. Serial No. 199,086. (No model.)

*To all whom it may concern:*

Be it known that I, ALFRED D. TAIT, a citizen of the United States, and a resident of Evanston, county of Cook, and State of Illinois, have invented certain new and useful Improvements in Whiffletree-Hooks, of which the following is a specification and which are illustrated in the accompanying drawings, forming a part thereof.

The object of the invention is to provide a whiffletree-hook simple in construction and easy to operate, yet reliable in its capacity to hold a trace without its becoming unhooked.

The invention consists in the construction and novel arrangement of parts, as hereinafter described, reference being had to the accompanying drawings, in which—

Figure 1 is a bottom plan of a left-side hook attached to a whiffletree with a part of the latter cut away to show the arrangement of parts of the hook. Fig. 2 is a front elevation of the left end of a whiffletree inverted with hook attached. Figs. 3 and 4 are detail views of parts of the hook; and Fig. 5 is a plan of a whiffletree, showing the position of the hooks in operation.

In the several figures, 12 indicates a U-shaped strap of metal designed to fit over the end of the whiffletree 10 and impart strength to it and at the same time form a bearing for the parts of the hook. It is secured to the whiffletree by means of bolts 13 and 14.

The hook (indicated by 11) has a shank $11^a$, which passes through suitable holes in the prongs of the strap and is firmly secured but so as to be free to rotate therein by means of the washer 15 and nut 16. The shoulder $11^c$ of the hook forms a bearing opposed to that of the washer 15.

The ends of the whiffletree are mortised out, as shown by 17, Figs. 1 and 2, to provide space for the parts of the hook. The shank $11^a$ of the hook is not of uniform diameter throughout its length, but has a short portion 18, Fig. 1, adjacent to the hook of a slightly larger diameter than the remainder. The surface of this portion is formed into a thread which is designed to carry the lock-nut 20.

The lock-nut 20 (shown separated from other parts, Fig. 3) is of an eccentric shape with reference to the threaded aperture which engages the shank $11^a$ of the hook. This eccentric form provides space for a small aperture 22, which constitutes a bearing for a spring coiled about the shank $11^a$ of the hook. A portion at one end of this spring is bent so that it extends parallel to the axis of the coil, and the end is inserted into the aperture 22 in the lock-nut 20 just mentioned. A portion at the opposite end of the spring extends outward radially from the axis of the coil, and a very short length near its end is bent sharply at right angles to form a small hook 23, which engages a notch in the U-shaped strap.

The free ends of the hooks for both the right and left ends of the whiffletree extend inwardly and the spring is so coiled on the shank $11^a$ of each that it tends to swing the free end of the hook down. Therefore in the right-side hook the lock-nut 20 is secured on the shank $11^a$ by means of a left-hand thread; otherwise the torsional effort of the spring would tend merely to loosen the nut. The shape of the hook in plan is sinuous with two bends, a larger bend convex outward forming the hook proper and a smaller reverse bend forming an outward projection $11^b$ for the ready reception of the eye of the trace. In elevation the hook has a slight offset upwardly from the median line of the whiffletree. The complete rotation of the hook 11 by means of the spring 21 is estopped by an extension of the head of the bolt 14. (Shown in position in Figs. 1 and 2 and separated from other parts in Fig. 4.) A groove $14^a$ in the extended head forms a seat for the hook, against which it is normally held by the torsional effort of the spring. It may be remarked also that there is an extension effort of the spring 21, which holds the lock-nut 20 against the prong of the U-shaped frame and prevents rattle.

The torsional effort of the spring may be increased by coiling the spring more tightly about the shank $11^a$. In practice this is done by grasping the small projection 23 with a pair of pliers and drawing out a portion of the spring and bending it down sharply at right angles, so the spring will have a shorter hold on the notch. All of the portion drawn out except a short length sufficient to form a hook to grasp the strap may now be cut off.

In the operation of hooking the trace onto the hook the eye of the trace is passed over the projecting end of the hook $11^b$. An upward pull now swings the hook against the torsional effort of the spring to the position shown by the dotted portion of Fig. 2. The eye of the trace can now be moved to its proper position on the hook, and on ceasing the upward pull the spring returns the hook against its seat $14^a$ in the head of the bolt 14. To unhook the trace, it is grasped firmly near the eye and given an upward pull. This upward pull will both open the hook to the position shown by the dotted portion, Fig. 2, and withdraw the eye of the trace. Then the spring will immediately swing the hook back to its seat.

Owing to the fact that the free end of the hook is so nearly parallel with the whiffletree the unhooking of the trace is accomplished without materially pulling back on the horse.

In Fig. 5 hooks for both the right and left ends of the whiffletree are shown attached, with the trace-eyes hooked on and in a working position. The draft in the shank $11^a$ of the hook due to the pull of the horse on the trace is communicated to the whiffletree both by the lock-nut 20 and the nut and washer 16 and 15. A portion of the pull on the hook is probably also communicated to the whiffletree through the bolt 14 by virtue of the shoulder formed by the groove $14^a$.

I claim as my invention—

1. In a whiffletree-hook, in combination, an oscillatable draft-hook having its shank parallel with the line of draft, a stop limiting the turning movement thereof, and a spring holding the hook against the stop.

2. In a whiffletree-hook, in combination, a spring-controlled oscillatable draft-hook, a strap forming the ferrule of the whiffletree and in which the hook is pivoted parallel with the line of draft, a stop limiting the turning movement of the draft-hook so grooved as to receive the hook and a spring turning the hook on its axis against the stop.

3. A whiffletree-hook having a rotative shank parallel with the line of draft and an arm extending laterally from the shank, and a spring for resisting the turning of the shank in one direction.

ALFRED D. TAIT.

Witnesses:
CHAS. B. GILLSON,
E. M. KLATCHER.